United States Patent

[11] 3,611,896

| [72] | Inventor | Koichi Aoki |
| | | Toyokawa, Japan |
| [21] | Appl. No. | 781,291 |
| [22] | Filed | Sept. 30, 1968 |
| [45] | Patented | Oct. 12, 1971 |
| [73] | Assignee | Minolta Camera Kabushiki Kaisha |
| | | Osaka, Japan |

[54] LENS PROTECTIVE DEVICE BUILT INTO THE CAMERA BODY
3 Claims, 9 Drawing Figs.

[52] U.S. Cl.............................................. 95/11 R, 350/65
[51] Int. Cl............................................... G03b 17/00
[50] Field of Search................................. 350/65; 95/11, 53, 12.5

[56] References Cited
UNITED STATES PATENTS

| 3,373,671 | 3/1968 | Jakob............................ | 95/11 |
| 3,427,943 | 2/1969 | Leibundgut.................. | 95/11 |
| 1,293,479 | 2/1919 | Laws............................. | 95/12.5 |
| 1,413,187 | 4/1922 | Paumier....................... | 95/12.5 |
| 2,632,252 | 3/1953 | Blais............................. | 350/65 |
| 2,696,672 | 12/1954 | Durfee......................... | 350/65 |
| 3,399,011 | 8/1968 | Heinger........................ | 95/11 X |
| 3,426,433 | 2/1969 | Anderson..................... | 350/65 X |

Primary Examiner—John M. Horan
Assistant Examiner—Alan Mathews
Attorney—Watson, Cole, Grindle & Watson ABSTRACT: A lens protective device built into the camera body operated by and automatically operated by the shutter release mechanism so that the protective part is caused to recede out of the lens light path just before the exposure begins and to come back in front of the lens, covering it, when the release mechanism returns to its original position.

INVENTOR
Koichi Aoki
BY Watson, Cole, Grindle & Watson
ATTORNEY

LENS PROTECTIVE DEVICE BUILT INTO THE CAMERA BODY

BACKGROUND OF THE INVENTION

The lens cap which is widely used as the lens protective device must be removed from the lens barrel each time a picture is taken, and the replaced. This procedure is troublesome and also it often happens that a chance for a picture is missed because of the time required to uncover the lens, film is wasted because of attempting a photograph with the lens cap on and, sometimes, the removed cap is lost.

The front lid of the known spring bellows camera helps to protect the lens as well as the soft bellows, but this too requires opening and closing procedure before and after each exposure.

The purpose of the present invention is to eliminate the preliminary procedure of taking off the cap before photographing, or of opening the front lid, as well as the procedure of putting on the lens cap or closing the front lid afterward.

SUMMARY OF THE INVENTION

The present invention consists in providing a lens protective device built into the camera body whose purpose is first to provide a lens protective device which allows instant photographing, and secondly to cause the lens protective part to recede out of the lens light path just before the beginning of exposure by the motion of the shutter release mechanism and to let the lens protective part automatically return to its original position in front of the lens as the release mechanism returns to its original position, and thirdly to shorten the time during which the lens is exposed ad much as possible so that the lens can be completely protected.

DESCRIPTION OF THE PREFERRED EMBODIMENT

Figure 1:
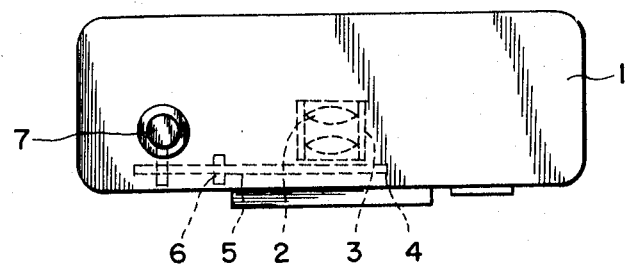
FIG. 1 is a top view of the internal construction of the essential parts of the first preferred embodiment of the present invention.
Figure 2:
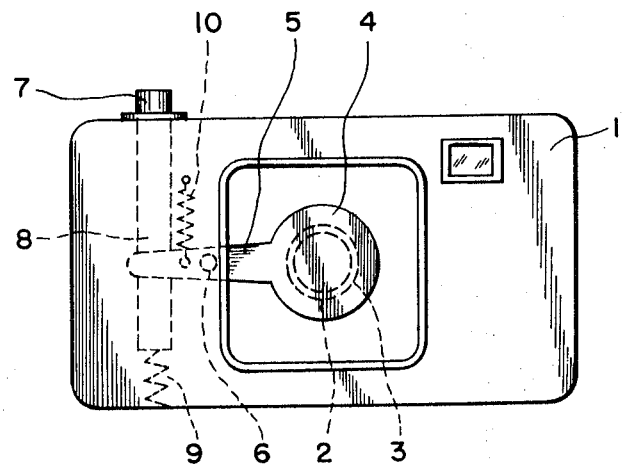
FIG. 2 is a front view of the said preferred embodiment.
Figure 3:
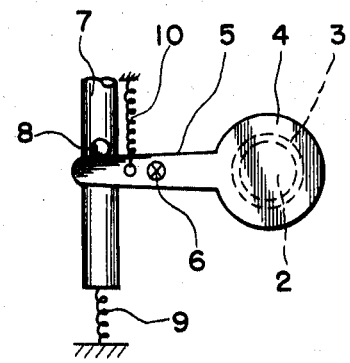
FIG. 3 is a front view of the mechanism of the release lever and the lens protective part of the said preferred embodiment.

Referring to the drawings in the first preferred embodiment shown in FIGS. 1, 2, 3, the image-forming lens window, through which the image-forming light comes in, and the finder window are arranged in the front of the camera body, and inside the camera body behind the image-forming lens window the lever 5 of the lens protective plate 4 is rotatably mounted axle 6 which lies parallel with the light axis. The protective plate or shield 4 covers the lens 2 which is supported in the lens barrel 3 behind the protective plate 4. The release lever 7 of the shutter slides vertically up and down inside the camera body and releases the shutter, as is known, at the lowest position and returns upward to its original position pushed by the spring 9. Release lever 7 carries a pin 8 which contacts and drives the lever 5 of the lens cover lever 4. The lever 5 is pulled by the weak return spring 10 so that it stays constantly in contact with the pin 8.

Thus, except when it is pushed down, the release lever 7 stays in its upward position owing to the spring 9, and the lever 5, which is given a clockwise bias by the return spring 10, is in contact with the pin 8 and the lens protective plate or shield 4 stays in front of the lens 2 and covers it. When the release lever 7 is pushed down, at an early stage of its downward movement the pin 8 pushes and rotates the lever 5 in the counterclockwise direction against the pull of the return spring 10 and the lens 2 is exposed, and as the release lever 7 is pushed farther down it releases the shutter, by means of known mechanism not shown, and when the release lever 7 is allowed to move upwardly the protective plate 4 returns to its original position covering the lens 2.

Figure 4:
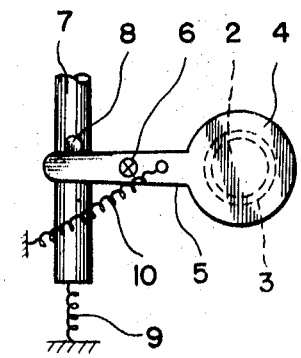
FIG. 4 the front view of a variation of the said preferred embodiment shown in FIG. 3.

FIG. 4 shows a variation in which the position of the spring 10 which gives the lever 5 the clockwise bias is changed.

Figure 5:
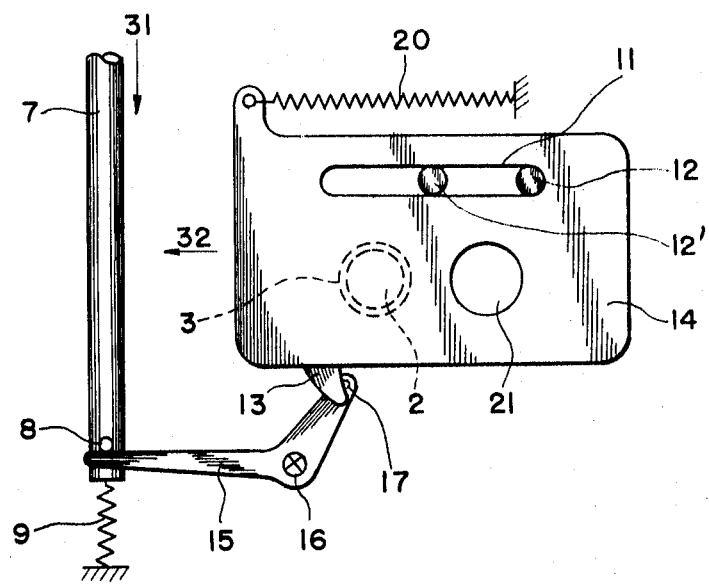
FIG. 5 is a front view of the mechanism of the second preferred embodiment of the present invention.

FIG. 5 shows an embodiment with a sliding lens protective plate or shield 14. This lens protective plate or shield 14 in which is provided a lens opening 21, slides horizontally right and left guided by the pin 12 on the camera body cooperating with the slot 11 and is biased to the right by a return spring 20. The pin 8 on the release lever 7 is in contact with a bellcrank lever 15 which is rotatably mounted on the axle 16 and the a pin 17 of the lever 15 is in contact with an arm 13 of the protective plate 14. Therefore, as the release lever 7 is pushed down, the protective plate 14 slides in the direction of the arrow 32 against the pull of return spring 20, and just as the opening 21 is in front of the lens 2 in the lens barrel 3 inside the camera body, the release lever 7 releases the shutter.

Figure 6:
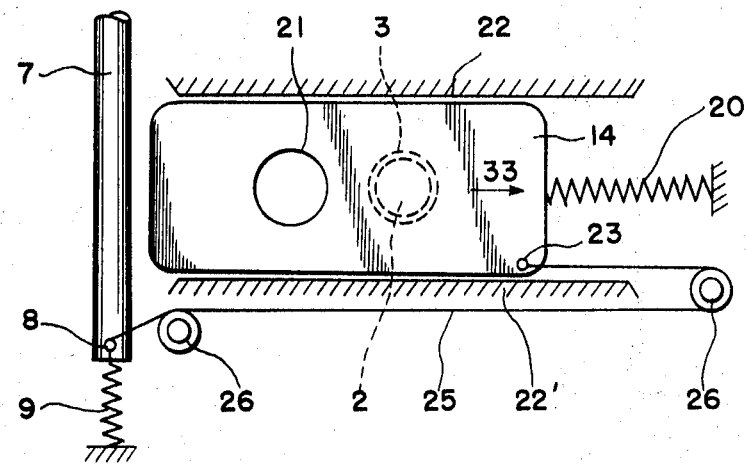
FIG. 6 is a front view of a variation of the said second preferred embodiment.

In FIG. 6 is shown a sliding protective plate or shield 14' which is driven by the wire 25 in place of the lever 15 and is urged leftward by the return spring 20. As the release lever 7 is pushed down, the wire 25, whose one end is connected with the pin 8 and which is guided by the rollers 26, pulls the plate 14' in the direction of the arrow 33, the plate 14 having a lens opening 21 which slides along the camera body 22, and the shutter is released when the opening 21 is just in front of the lens 2.

Figure 7:
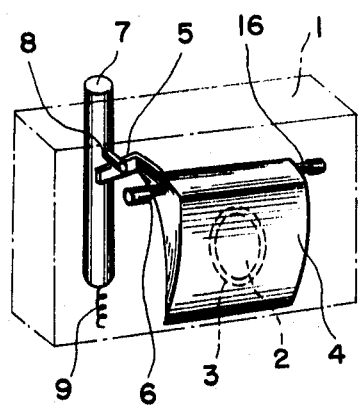
FIG. 7 is a perspective view of the construction of the essential parts of the third preferred embodiment of the present invention.
Figure 8:
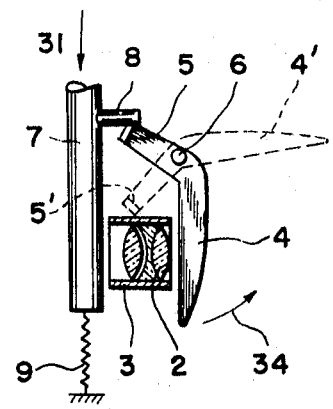
FIG. 8 is a side view of the mechanism of the said third preferred embodiment.

In the embodiment shown in FIGS. 7 and 8, the lens protective plate 4' is set in motion, just like the one shown in FIGS. 1, 2, and 3, in cooperation with the release lever 7, but the axle 6' on which the protective plate rotates lies at right angles with the light axis. Owing to this construction, the protective plate 4, which comes to the position shown by the broken line 4' in FIG. 8 in accordance with the downward movement of the release lever 7, helps shut off the light not coming from subject and prevents flare.

Figure 9:
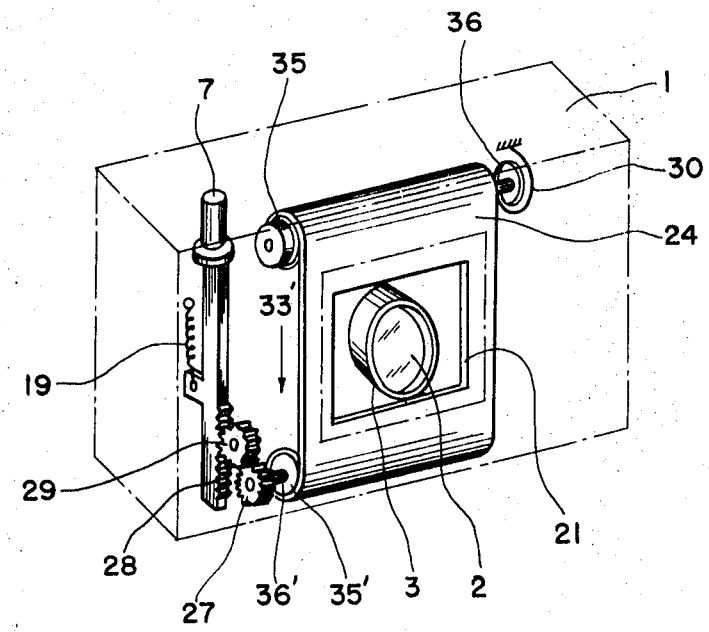
FIG. 9 is a perspective view of the construction of the essential parts of the fourth preferred embodiment of the present invention.

FIG. 9 shows an embodiment in which is used a flexible screen or shield as the lens protective part. The return spring consists of the coil spring 30 which is connected with the axle 36 of the upper roller 35 and gives the roller 35 the tendency to wind up the protective screen 24. One end of the protective screen 24 is attached to the upper roller 35 and the other to the lower roller 35', and the screen has the opening 21. On the lower part of the release lever 7 is formed the rack 28, and the lazy pinion 29 which is in gear with the rack 28 is also engaged with the gear 27 on the axle 36' of the lower roller 35'. The numeral 19 indicates the return spring of the release lever.

Therefore, as the release lever 7 is pushed down, the rack 28 rotates the gear 27 through the lazy pinion 29, and the lower roller 35' rotates and causes the protective screen 24 to move in the direction of the arrow 33', and winds up the coil spring 30. When the opening 21 of the protective screen 24 is just in front of the lens 2, the shutter is released.

In all of the described embodiments of the present invention, the lens protective part covers and protects the lens without fail when the camera is not in use, and when the shutter release part is pushed down for the purpose of photographing, the protective part recedes out of the lens light path so that the lens is exposed and photographing is achieved. When the release lever is itself released, the protective part automatically returns into the position covering the lens. Thus the lens, which is only exposed from just before the photographing until just after the photographing, can be safely and completely protected.

I claim:

1. In a photographic camera having a lens, a shutter, and shutter release mechanism including a manually operable shutter release member and means urging said member toward closed-shutter position; a lens protective device comprising a shield mounted on said camera for movement from a normal position covering the front of said lens to a position in which the said lens is uncovered, means urging said shield to lens-covering position, and means operatively connecting said shield and said shutter release member for moving said shield to lens-uncovering position upon operation of said member to release said shutter, said shield being mounted on said camera for rectilinear movement at right angles to the axis of the image-forming light path to said lens, said shield having a lens-uncovering opening therein which lies in front of said lens when said shield is in lens-uncovering position.

2. A device according to claim 1, said means connecting said shield and said member comprising a wire.

3. In a photographic camera having a lens, a shutter, and shutter release mechanism including a manually operable shutter release member and means urging said member toward closed-shutter position; a lens protective device comprising a shield mounted on said camera for movement from a normal position covering the front of said lens to a position in which the said lens in uncovered, means urging said shield to lens-covering position, and means operatively connecting said shield and said shutter release member for moving said shield to lens-uncovering position upon operation of said member to release said shutter, said shield comprising a flexible screen having a lens-uncovering opening therein, and rollers mounting the respective ends of said screen on said camera on opposite sides of said lens, said screen being enough longer than the distance between said rollers so that said opening is movable between lens-covering and lens-uncovering positions.